US012712172B2

(12) United States Patent
Rössler et al.

(10) Patent No.: US 12,712,172 B2
(45) Date of Patent: Aug. 18, 2026

(54) DEVICE FOR CONTROLLING TRAPPED IONS WITH AN ELECTRODE LAYER OF LOW SURFACE ROUGHNESS

(71) Applicant: Infineon Technologies Austria AG, Villach (AT)

(72) Inventors: Clemens Rössler, Villach (AT); Fabian Anmasser, Spittal an der Drau (AT); Eva-Maria Andrea Gritsch, Spittal an der Drau (AT); Christoph Gruber, Wernberg (AT)

(73) Assignee: Infineon Technologies Austria AG, Villach (AT)

( * ) Notice: Subject to any disclaimer, the term of this patent is extended or adjusted under 35 U.S.C. 154(b) by 407 days.

(21) Appl. No.: 18/409,885

(22) Filed: Jan. 11, 2024

(65) Prior Publication Data

US 2024/0249932 A1 Jul. 25, 2024

(30) Foreign Application Priority Data

Jan. 23, 2023 (EP) .................................... 23152924

(51) Int. Cl.
*H01J 49/42* (2006.01)

(52) U.S. Cl.
CPC ........ *H01J 49/4255* (2013.01); *H01J 49/424* (2013.01)

(58) Field of Classification Search
CPC ....... H01J 49/4255; H01J 49/424; G21K 1/00
See application file for complete search history.

(56) References Cited

U.S. PATENT DOCUMENTS 12,080,532 B2 * 9/2024 Chaudhary ......... H01J 49/0018
2004/0140571 A1 * 7/2004 Tomura .................. H05K 3/321 257/E23.06

(Continued)

FOREIGN PATENT DOCUMENTS

CN 111128672 A * 5/2020 .......... H01J 49/4255
CN 121601515 A * 3/2026

(Continued)

OTHER PUBLICATIONS

Allcock, D T C, et al., "Implementation of a symmetric surface-electrode ion trap with field compensation using a modulated Raman effect", New Journal of Physics , vol. 12, May 17, 2010, pp. 1-18.

(Continued)

*Primary Examiner* — David A Vanore
(74) *Attorney, Agent, or Firm* — Murphy, Bilak & Homiller, PLLC

(57) ABSTRACT

A micro-fabricated device for controlling trapped ions includes a substrate. A structured electrode layer is disposed over the substrate. The structured electrode layer forms a plurality of electrodes of an ion trap configured to trap ions in a space above the structured electrode layer. The structured electrode layer is formed of a multilayer stack. The multilayer stack includes an electrically conductive smoothing layer having a planarized surface and an electrically conductive top layer disposed over the planarized surface of the smoothing layer. The top layer provides an exposed surface of the structured electrode layer, the exposed surface having a mean surface roughness equal to or less than Ra=5 nm.

20 Claims, 4 Drawing Sheets

(56) References Cited

U.S. PATENT DOCUMENTS

| | | | | |
|---|---|---|---|---|
| 2012/0264259 | A1* | 10/2012 | Hirler | H10D 30/668 438/459 |
| 2017/0154831 | A1* | 6/2017 | Standing | H10W 74/111 |
| 2019/0198306 | A1 | 6/2019 | Hosaka | |
| 2023/0102515 | A1* | 3/2023 | Purwin | G06N 10/40 250/489 |
| 2023/0232725 | A1* | 7/2023 | Langheinrich | H10N 60/11 |
| 2024/0249932 | A1* | 7/2024 | Rössler | G21K 1/00 |
| 2025/0318443 | A1* | 10/2025 | Lee | H10N 60/12 |

FOREIGN PATENT DOCUMENTS

| | | | | |
|---|---|---|---|---|
| JP | 2012502420 A5 | * | 10/2012 | |
| JP | 2025116839 A | * | 8/2025 | G03G 15/0896 |

OTHER PUBLICATIONS

Bautista-Salvador, Amado, "Integrated Electromagnets and Radiofrequency Spectroscopy in a Planar Paul Trap", Dissertation, 2015, pp. 1-188.

Brown, Kenneth R., et al., "Materials challenges for trapped-ion quantum computers", Nature Reviews, Materials, vol. 6, Oct. 2021, pp. 892-905.

Hou, Yizhu, et al., "Controlling the Surface Roughness of Surface-Electrode Ion Trap Based on Micro-Nano Fabrication", Coatings, 11, 406, 2021, pp. 1-10.

Ou, Baoquan, et al., "Optimization of parameters of a surface-electrode ion trap and experimental study of influences of surface on ion lifetime", Science China, Physics, Mechanics & Astronomy, vol. 59 No. 12, Dec. 2016, pp. 123011-1-123011-7.

* cited by examiner

DEVICE FOR CONTROLLING TRAPPED IONS WITH AN ELECTRODE LAYER OF LOW SURFACE ROUGHNESS

TECHNICAL FIELD

This disclosure relates generally to the field of ion traps, and in particular to ion traps for quantum computing and methods of manufacturing such devices.

BACKGROUND

Trapped ions are a promising candidate for use as qubits (quantum bits) in quantum computers since they can be trapped with long lifetimes in a scalable array by virtue of electromagnetic fields. Presently, the most advanced ion traps can control about 50 qubits individually and can maintain up to 16 qubits in a fully entangled state. Future quantum computers may need to increase the number of controllable qubits to more than 100 or even 1000 to outperform classical supercomputers. Further, the number of ions used for each qubit may need to be raised in future to about 6 to 100 ions to ensure efficient error-correction during quantum computing.

As the number of ions increases, the requirements for device control and interference (e.g., crosstalk) suppression may increase as well. The surface electrodes of the ion trap may play an important role in this regard. In examples, the electrodes may have high electrical conductivity to handle high capacitive charging currents. It is also desirable that surface impurities and light scattering from the electrode surfaces can be kept low. In addition, surface electrodes can cause unwanted heating of the ions, which should be minimized.

SUMMARY

According to an aspect of the disclosure, a micro-fabricated device for controlling trapped ions includes a substrate. A structured electrode layer is disposed over the substrate. The structured electrode layer forms a plurality of electrodes of an ion trap configured to trap ions in a space above the structured electrode layer. The structured electrode layer is formed of a multilayer stack. The multilayer stack includes an electrically conductive smoothing layer having a planarized surface and an electrically conductive top layer disposed over the planarized surface of the smoothing layer. The top layer provides an exposed surface of the structured electrode layer, the exposed surface having a mean surface roughness equal to or less than Ra=5 nm.

According to an aspect of the disclosure, a method of manufacturing a micro-fabricated device for controlling trapped ions comprises providing a substrate. An electrically conductive smoothing layer is formed over the substrate. The smoothing layer is planarized to form a planarized surface of the smoothing layer. An electrically conductive top layer is formed over the planarized surface of the smoothing layer, the top layer providing an exposed surface of a structured electrode layer, the exposed surface having a mean surface roughness equal to or less than Ra=5 nm.

BRIEF DESCRIPTION OF THE DRAWINGS

The elements of the drawings are not necessarily to scale relative to each other. Like reference numerals designate corresponding similar parts. The features of the various illustrated examples can be combined unless they exclude each other and/or can be selectively omitted if not described to be necessarily required. Examples are depicted in the drawings and are exemplarily detailed in the description which follows.

DETAILED DESCRIPTION

The words "over" or "on" or "beneath" with regard to a part, element or material layer formed or located or disposed or arranged or placed "over" or "on" or "beneath" a surface may be used herein to mean that the part, element or material layer be located (e.g. placed, formed, arranged, disposed, placed, etc.) "directly on" or "directly under", e.g. in direct contact with, the implied surface. The word "over" or "on" or "beneath" used with regard to a part, element or material layer formed or located or disposed or arranged or placed "over" or "on" or "beneath" a surface may, however, either be used herein to mean that the part, element or material layer be located (e.g. placed, formed, arranged, deposited, etc.) "indirectly on" or "indirectly under" the implied surface, with one or more additional parts, elements or layers being arranged between the implied surface and the part, element or material layer.

Figure 1:
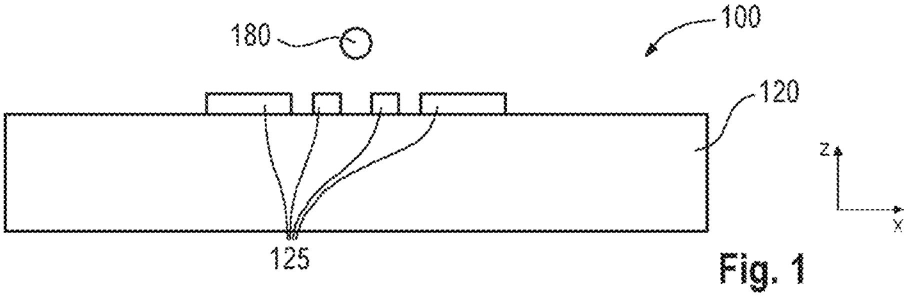
FIG. 1 is a schematic cross-sectional view of an exemplary device for controlling trapped ions.

Referring to FIG. 1, a device 100 for controlling trapped ions may include a substrate 120 and a structured electrode layer 125 disposed over the substrate 120. The structured electrode layer 125 forms electrodes of an ion trap configured to trap one or a plurality of ions 180 in a space above the structured electrode layer 125 (only one ion 180 is illustrated in FIG. 1 for ease of illustration).

The substrate 120 may include or be of a dielectric material or a semiconductor material. For example, the substrate 120 includes or is of sapphire or fused silica or quartz or silicon.

The location (s) of the ion (s) 180 can be controlled by the one or more ion traps by virtue of electrical voltages applied to the structured electrode layer 125. For instance, the ion (s) 180 can be moved in the space in one or more lateral directions (e.g. in the X-direction or in the Y-direction (see e.g. FIG. 3) or in any direction lying in a plane which is normal to the Z-direction) by virtue of AC and DC voltages separately coupled to specific electrodes of the structured electrode layer 125.

The structured electrode layer 125 and thus the electrodes of the ion trap (s) are fabricated by micro-fabrication techniques. The substrate 120 may be substantially planar. The Z-direction may represent the height dimension of the device 100. The X-direction and the Y-direction are perpendicular to each other and define a plane in the width and length direction of the device 100, which is normal to the Z-direction.

In FIG. 1, the ion trap of the device 100 is exemplified to be designed as a so-called "surface-electrode" ion trap. In surface-electrode ion traps all electrodes (i.e. DC electrodes and RF electrodes) are contained in a single plane. Such two-dimensional (2D) ion trap geometries provide for high scalability. As will be described further below, in other examples the device 100 for controlling trapped ions may use three-dimensional (3D) ion trap geometry, see e.g. FIG. 4.

In the examples disclosed herein the structured electrode layer 125 may include RF electrodes for RF trapping and DC electrodes for static electric-field trapping. An ion trap disclosed herein can trap many ions 180 that may be individually addressable and movable by appropriately controlling the potentials of the electrodes of the ion trap (s).

Figure 2:
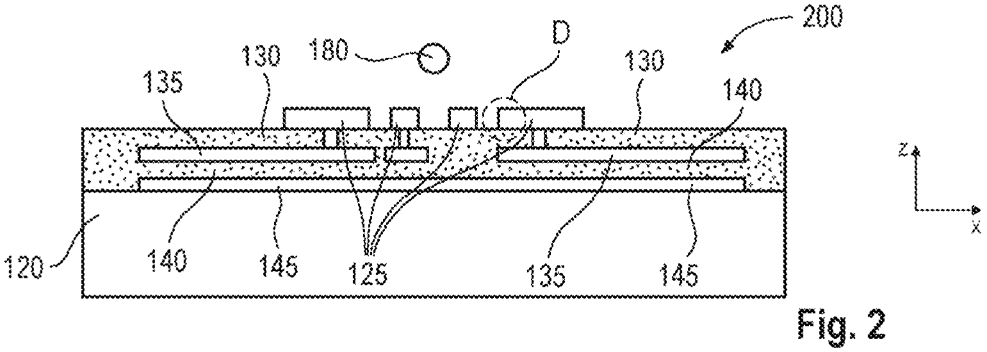
FIG. 2 is a schematic cross-sectional view of an exemplary device for controlling trapped ions having a multilayer micro-fabricated electrode structure.

Referring to FIG. 2, a device 200 for controlling trapped ions may have a multilayer micro-fabricated electrode structure. For instance, compared to the device 100, the device 200 may further comprise a structured metal layer 135 disposed over the substrate 120 and a dielectric layer 130 disposed over the structured metal layer 135 and disposed beneath the structured electrode layer 125. Further, the device 200 may, optionally, include more metal layers, e.g. a (structured or non-structured) further metal layer 145 disposed over the substrate 120 and separated from the structured metal layer 135 by a dielectric layer 140 disposed over the further metal layer 145 and beneath the structured metal layer 135.

The structured electrode layer 125 and the structured metal layer 135 may form a multilayer metal interconnect configured to electrically connect the electrodes of the structured electrode layer 125 to external circuitry. As shown in FIG. 2, the structured metal layer 135 may be electrically connected to the (separate) electrodes of the structured electrode layer 125 by vias extending through the dielectric layer 130. That is, the structured metal layer 135 may, e.g., be structured as an electrical redistribution layer. This allows the formation of complex electrode structures and insular electrodes in the structured electrode layer 125. Further, a multilayer architecture of the device 200 for controlling trapped ions allows scalability of the device 200.

The further metal layer 145 may, e.g., be a continuous shielding layer. In other examples, the further metal layer 145 may also be a structured metal layer used, e.g., as an additional electrical redistribution layer contributing for implementing a two level electrode interconnect structure.

In other examples, the order of the structured metal layer 135 and the further metal layer 145 may be interchanged, i.e. the structured metal layer 135 may be replaced by a continuous shielding layer and the further metal layer 145 may be formed as a structure metal layer serving as a wiring layer for the electrodes. In this case, the continuous shielding layer serves to shield the trap electrodes from the wiring layer. Still further, it is possible that the structured metal layer 135 is omitted so that the further metal layer 145 replaces the structured metal layer 135.

The dielectric layers 130, 140 may, e.g., be of an inorganic dielectric material such as, e.g., silicon oxide and/or silicon nitride. They may be formed by micro-fabrication, e.g. by plasma-CVD (chemical vapor deposition) or, e.g., by thermal decomposition of tetraethyl orthosilicate (TEOS).

Figure 3:
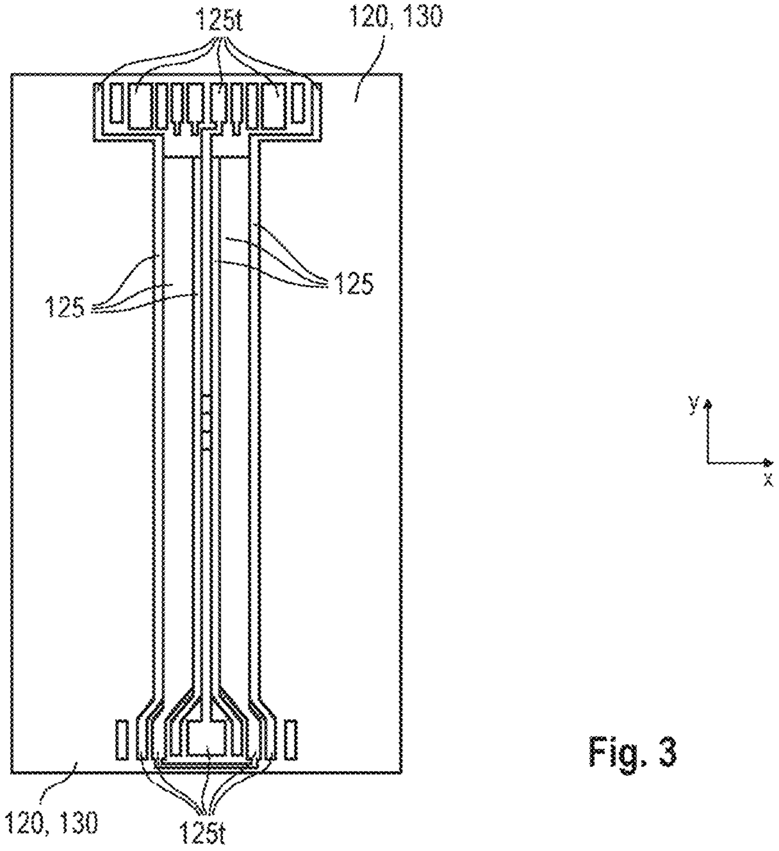
FIG. 3 is a top view of a substrate of an exemplary device for controlling trapped ions having a similar construction as the device for controlling trapped ions as shown in FIGS. 1 and 2.

FIG. 3 is a schematic top view of a simplified electrode layout formed by the structured electrode layer 125. A single electrode layer 125 (see, e.g., FIG. 1) or a multilayer design (see, e.g., FIG. 2) may be used. Some of the electrodes are formed as stripe electrodes, while other electrodes may be formed as insular electrodes of small lateral dimensions. Many different electrode layouts are known in the art and could be used in the examples disclosed herein. Further, the electrode layout provided by the structured electrode layer 125 may comprise Y-junctions and/or X-junctions (not shown).

FIG. 3 illustrates terminal lands 125*t* of the structured electrode layer 125 available for electrically connecting the micro-fabricated electrode structure 125 including its RF and DC electrodes via connectors (not shown, e.g. wire bonds) to external circuitry (not shown). Other designs of electrical connections of the electrical interconnect (see e.g. FIG. 2) are also feasible, and it is to be noted that the electrodes may, in other examples, not be connected to terminal lands 125*t* exposed at the substrate 120 but, e.g., to vias which directly connect to integrated circuitry (not shown) in the substrate 120.

Figure 4:
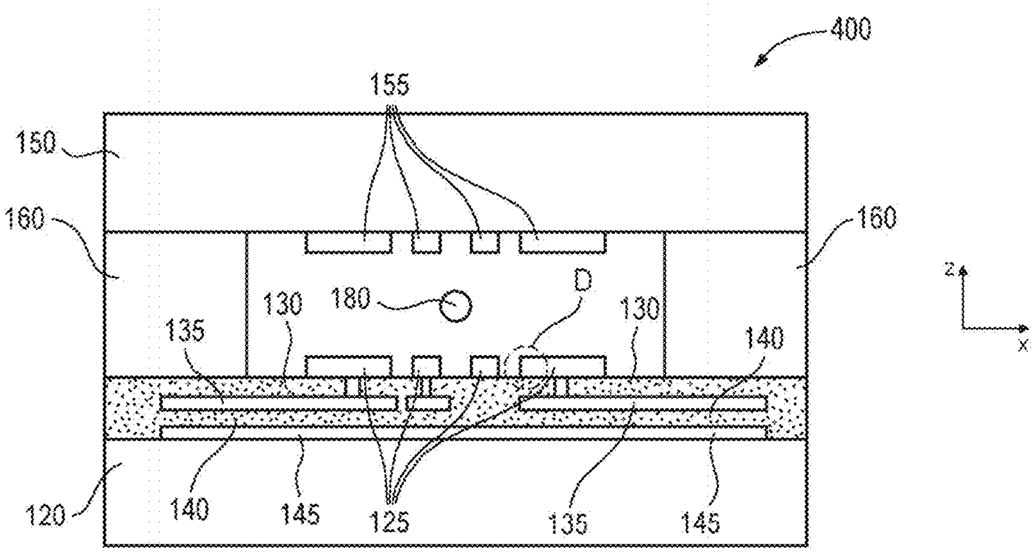
FIG. 4 is a schematic cross-sectional view of an exemplary device for controlling trapped ions having a multilayer micro-fabricated electrode structure and a further substrate disposed over and spaced apart from the substrate as shown in FIG. 2.

FIG. 4 illustrates a device 400 for controlling trapped ions which is implemented as a 3D ion trap. 3D ion trap geometries such as, e.g., linear Paul trap(s) distinguish over the surface-electrode trap geometries (see, e.g., FIGS. 1 and 2) by allowing substantially higher potential depths and higher trap frequencies. In the exemplary device 400 shown in FIG. 4, the ion (s) 180 are trapped between the substrate 120 and a further substrate 150 disposed over and spaced apart from the substrate 120. One or a plurality of spacer members 160 may be disposed between the substrate 120 and the further substrate 150.

Ion traps disclosed herein may be linear traps in which RF trapping is used in two dimensions while static electric-field trapping is used in the third dimension.

The spacer members 160 define the spacing between the substrate 120 and the further substrate 150. The spacer members 160 may be bonded to the substrate 120 and/or to the further substrate 150 by wafer-bonding techniques. For instance, glass-bonding techniques or eutectic bonding techniques or anodic bonding techniques or thermocompression bonding techniques may be applied.

A structured top electrode layer 155 is disposed at a main side of the further substrate 150 opposite the structured electrode layer 125. The structured top electrode layer 155 forms electrodes of the (three-dimensional) ion trap. The ion trap is configured to trap ion (s) 180 in the space between the structured electrode layer 125 and the structured top electrode layer 155.

The structured top electrode layer 155 may also be formed by micro-fabrication techniques. Generally, micro-fabrication techniques for electrode formation and structuring may, e.g., involve photolithography methods (e.g. including photoresist application, patterning, etching) and/or deposition techniques (e.g. chemical vapor deposition (CVD), physical vapor deposition (PVD), sputtering) and/or plating techniques (e.g. electroless plating, galvanic plating) for applying dielectric layers 130, 140, metal layers 135, 145 and/or electrode layers 125, 155. Further, micro-fabrication techniques for electrode formation and structuring may include etching processes for structuring photoresist layers, dielectric layers 130, 140, metal layers 135, 145, and electrode layers 125, 155.

The structured top electrode layer 155 may be electrically connected to external circuitry by an electrical interconnect (not shown) which may be similar to the electrical interconnect described above in the context of the substrate 120. In this respect, reference is made to the above description to avoid reiteration.

The electrodes formed in the structured electrode layer 125 and/or the structured top electrode layer 155 may be structured with micrometer or sub-micrometer scale precision and alignment accuracy. This allows to achieve complex electrode layouts without loss of controllability of the trapped ions 180.

In devices 100, 200, 400 for controlling trapped ions it may be desirable to keep unwanted heating of ions as low as possible. Ion heating can be described as an increase of the kinetic energy of the ions due to undesired micro movements. Typically, a distinction is made between explainable heating effects (e.g. Johnson noise) and unexplained ones (so-called abnormal heating). Increased understanding of and mitigation of the abnormal heating effects may help to achieve a higher quality of the qubit operations.

Smooth electrode surfaces could lead to lower heating effects for several reasons: First, less laser light may be scattered due to the low surface topography, resulting in less crosstalk from RF to DC electrodes. In addition, smooth electrode surfaces may provide less surface for charged adsorbates to accumulate, which may contribute to noise. In addition, smooth electrode surfaces may reduce the risk of local field overshoots, and rough electrode surfaces could lead to excessive RF losses and affect the trapping capability of the surface electrode ion trap.

The origin of abnormal heating effect is still unknown, in many cases. However, it may possibly be the case that surface roughness could have an influence on the abnormal heating effect.

Figure 5:
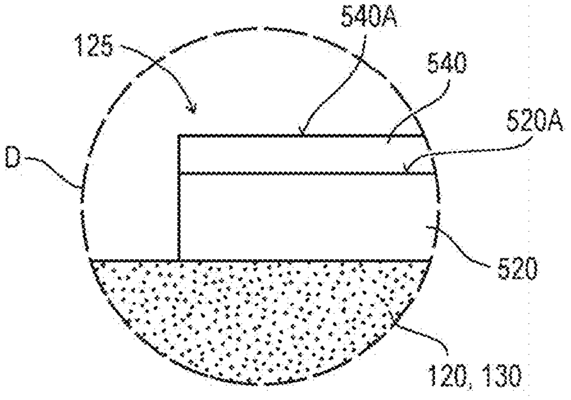
FIG. 5 is a schematic cross-sectional view of an example of detail D shown in FIGS. 2 and 4.

Referring to FIG. 5, according to an aspect of the disclosure, the structured electrode layer 125 includes an electrically conductive smoothing layer 520. The electrically conductive smoothing layer 520 has a planarized surface 520A. The structured electrode layer 125 further includes an electrically conductive top layer 540. The top layer 540 is disposed over the planarized surface 520A of the smoothing layer 520. The top layer provides for an exposed surface 540A of the structured electrode layer 125. The exposed surface 540A has a mean surface roughness equal to or less than Ra=5 nm, in particular 4.5 nm or more in particular 4 nm.

That way, the adverse effects associated with a rough electrode surface are avoided.

The mean roughness Ra of a surface (such as the surface 540A of the top layer 540 or the surface 520A of the smoothing layer 520) may be determined, using an atomic force microscope (AFM) to determine the heights $y_i$ at individual measurement points denoted by index i. The mean roughness Ra is then given by $$Ra = \frac{1}{n}\sum |y_i - A|,$$

where A is the mean value of all measured heights $y_i$ and n is the number of measurements. The mean roughness Ra may indicate an average of profile height deviations from a mean height line above a surface.

According to the present disclosure, the mean surface roughness of the exposed surface 540A of the top layer 540 may be controlled by the mean surface roughness achieved for the planarized surface 520A of the smoothing layer 520. For example, the higher the mean surface roughness of the planarized surface 520A of the smoothing layer 520, the higher may be the achievable smoothness of the exposed surface 540A of the top layer 540. In other words, the surface 540A of the top layer 540 may adopt the low mean surface roughness from the underlying planarized surface 520A of the smoothing layer 520.

Typically, the thickness of the top layer 540 may also influence the mean surface roughness of the exposed surface 540A. For example, the higher the thickness of the top layer may be, the higher may be the roughness of the exposed surface 540A of the top layer. In examples, the top layer 540 may have a thickness equal to or less than 300 nm or 200 nm or 150 nm. In other examples, the top layer 540 may have a thickness greater than 100 nm or greater than 400 nm. By using the smoothing layer 520 with its planarized surface 520A it may become possible to obtain a rather thick top layer 540 (such as equal to or less than 100 nm or equal to or less than 200 nm or equal to or less than 300 nm or equal to or less than 500 nm or equal to or less than 1 μm or equal to or less than 1.5 μm) which still comprises a rather low mean surface roughness (such as Ra equal to or smaller than 5 nm). In examples, the thickness of the top layer 540 may be in a range between 50 nm and 1.5 μm, in particular between 100 nm and 1 μm or between 400 nm and 1 μm.

The thickness of the smoothing layer 520 may be controlled by a planarization process which is used to create the planarized surface 520A of the smoothing layer 520. For example, the smoothing layer 520 may have a thickness equal to or less than 500 nm or 400 nm or 350 nm.

Figure 6:
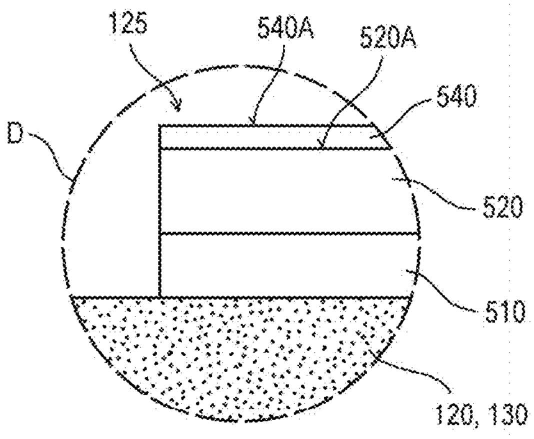
FIG. 6 is a schematic cross-sectional view of another example of detail D shown in FIGS. 2 and 4.

FIG. 6 illustrates another example of detail D. In FIG. 6 the multilayer stack, which is included in the structured electrode layer 125 or of which the structured electrode layer 125 consists, additionally contains a metal layer 510 disposed between the substrate 120 (or, e.g., in particular the dielectric layer 130) and the smoothing layer 520.

The metal layer 510 may have the function to carry relatively high charging currents, in particular capacitive charging currents for RF electrodes. To that end, the metal layer 510 may have a thickness equal to or greater than 500 nm or 1000 nm or 1500 nm. Otherwise, if the metal layer 510 is not present in the multilayer stack included in the structured electrode layer 125, the smoothing layer 520 should have an appropriate thickness to handle the electrode currents. The exposed surface 540A has a mean surface roughness equal to or less than Ra=5 nm, in particular 4.5 nm or more in particular 4 nm. These values of the surface roughness may ensure that stray light scattering from the surface to the ions may be reduced as compared to higher values of surface roughness.

Figure 7:
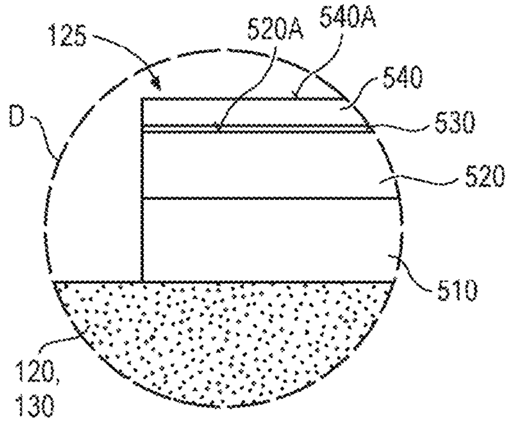
FIG. 7 is a schematic cross-sectional view of still another example of detail D shown in FIGS. 2 and 4.

Referring to FIG. 7, the multilayer stack contained in or being the structured electrode layer 125 may further include an adhesion layer 530. The adhesion layer 530 is disposed between the planarized surface 520A of the smoothing layer 520 and the top layer 540. The adhesion layer 530 may optionally be used to improve the adhesion between the smoothing layer 520 and the top layer 540. The adhesion layer 530 may, e.g., have a layer thickness equal to or less than 50 nm or 30 nm. Again, the exposed surface 540A has a mean surface roughness equal to or less than Ra=5 nm, in particular 4.5 nm or more in particular 4 nm.

The metal layer 510 may, e.g., be of or include an AlSiCu alloy or an AlCu alloy or Cu or Al. An exemplary AlSiCu alloy may have a chemical composition in percent by weight (% wt) of 98.5% wt of Al, 1.0% wt of Si and 0.5% wt of Cu, balance incidental impurities, for example. An exemplary AlCu alloy may have a chemical composition in percent by weight of 99.5% wt of Al and 0.5% wt of Cu, balance incidental impurities, for example. These materials are widely used in microfabrication technology. In other examples, the metal material may be of Au or Ag, or may include or be of any combination of the above-mentioned materials.

The material of the smoothing layer 520 should be chosen so as to allow the generation of a planarized surface 520A of high smoothness (i.e. low roughness). The smoothness obtainable at the planarized surface 520A may limit the smoothness which can at best be obtained at the exposed surface 540A of the top layer 540. Therefore, the material of the smoothing layer 520 should qualify as a material which has high planarization performance, e.g. a high performance for chemical mechanical planarization (CMP) processing or other planarization methods.

For example, the material of the smoothing layer 520 may, e.g., comprise or be of TiW or Ti or W or Al or AlSiCu or Cu, or may include or be of any combination of these materials. These materials may allow to produce a highly planar surface 520A. As to the alloy TiW, an exemplary chemical composition in percent by weight (% wt) is, e.g., 18 to 20% wt of Ti, the balance W and incidental impurities. However, other chemical compositions in other percent by weight are also contemplated.

For example, the material of the top layer 540 may, e.g., comprise or be of TiN or Ti, or may include or be of any combination of these materials.

TiN is a material with high hardness, which exhibits metallic properties. It is known to be used as a barrier metal in microelectronics. Ti also has high hardness and is, e.g., used for specific applications in microelectronics.

From physical considerations, it is believed that hard materials, such as, e.g., TiN or Ti, may be advantageous as surface electrode material in the ion trap. However, it is often difficult to produce smooth surfaces from hard materials.

On the other hand, TiN or Ti, among other materials of high hardness, adopt the topography and roughness of the underlying layer. Therefore, it is the smoothing layer 520 which may cause the high smoothness (e.g. Ra≤5 nm) of the exposed surface 540A of the top layer 540, while the material of the top layer 540 provides for the desired hardness of the exposed electrode surface 540A. For example, a thickness of a TiN or Ti top layer 540 may have a thickness equal to or less than 300 nm or 200 nm or 150 nm. In other examples, a TiN or Ti top layer 540 may have a thickness greater than 100 nm or greater than 400 nm. By using the smoothing layer 520 with its planarized surface 520A it may become possible to obtain a rather thick TiN or Ti top layer 540 (such as equal to or less than 100 nm or equal to or less than 200 nm or equal to or less than 300 nm or equal to or less than 500 nm or equal to or less than 1 μm or equal to or less than 1.5 μm) which still comprises a rather low mean surface roughness (such as Ra equal to or smaller than 5 nm). In examples, the thickness of the top layer 540 may be in a range between 50 nm and 1.5 μm, in particular between 100 nm and 1 μm or between 400 nm and 1 μm.

For a multilayer stack including the top layer 540, the smoothing layer 520 and the metal layer 510 (see, e.g., FIGS. 6 and 7), the following combinations may, e.g., be used (written in the notation [top layer 540 | smoothing layer 520 | metal layer 510]):

[TiN |Ti | Al], [TiN | Ti | AlSiCu], [TiN | Ti | Cu],
[TiN |W | Al], [TiN | W | AlSiCu], [TiN | W | Cu],
[TiN |TiW | Al], [TiN | TiW | AlSiCu], [TiN | TiW | Cu],
[TiN | Ta | Al], [TiN | Ta | AlSiCu], [TiN | Ta | Cu],
[Ti | W | Al], [Ti | W | AlSiCu], [Ti | W | Cu],
[Ti | TiW | Al], [Ti | TiW | AlSiCu], [Ti | TiW | Cu],
[Ti | Ta | Al], [Ti | Ta | AlSiCu], [Ti | Ta | Cu].

However, this set of layers is not intended to be limiting and other combinations are also contemplated.

For a multilayer stack including the top layer 540 and the smoothing layer 520 but no additional metal layer 510 (see, e.g., FIG. 5), the following combinations may, e.g., be used in the notation [top layer 540 | smoothing layer 520]:

[TiN | Al], [TiN | AlSiCu], [TiN | Cu], [Ti | Al],
[Ti | AlSiCu], [Ti | Cu].

That is, if no additional metal layer 510 is used, the smoothing layer 520 itself may contain or consist of a metal. Generally, a lower thick metal layer (e.g., the smoothing layer 520 or the metal layer 510) may be advantageous in terms of high current carrying capacity. It is also relatively soft, so that stresses can be compensated.

Figure 8:
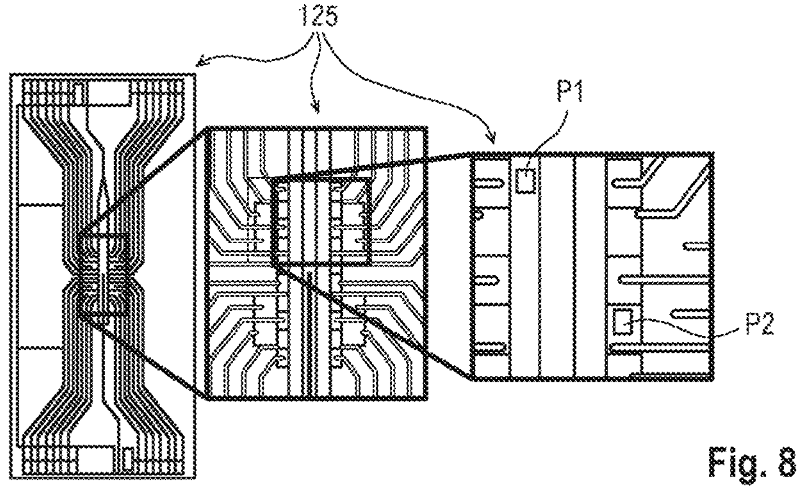
FIG. 8 is a top view of a substrate of an exemplary device for controlling trapped ions showing an exemplary electrode layout and measurement areas on the electrodes where the surface roughness was measured.

FIG. 8 is a top view of an exemplary electrode layout in different magnifications. Measurement areas P1, P2 on the electrodes, where the surface roughness Ra was measured on the electrodes, are indicated. From FIG. 8 it is apparent that the measurement areas P1, P2 were located in a central region of the ion trap. While P1 is located on an RF stripe electrode, P2 is located on a rectangular DC electrode. The measurement was performed by AFM microscopy which allows an accumulation of accurate height data across the measurement areas P1 and P2.

All disclosure in connection with the structured electrode layer 125, in particular the layer stacks of FIGS. 5 to 7, may equally apply to the structured top electrode layer 155 of a 3D device 400 for controlling trapped ions, and reference is made to the above disclosure in order to avoid reiteration.

Figure 9A:
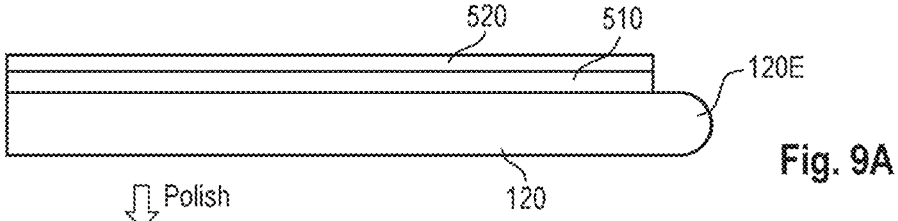
FIGS. 9A-9C illustrate exemplary stages of a method of manufacturing a micro-fabricated device for controlling trapped ions.
Figure 9B:
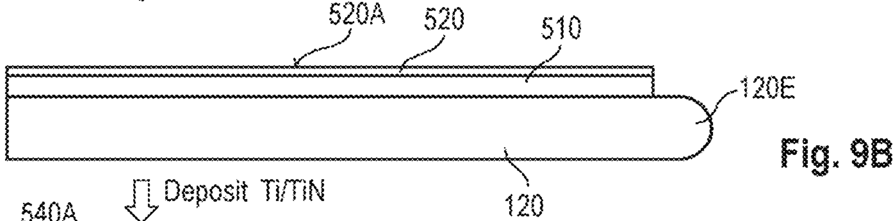
Figure 9C:
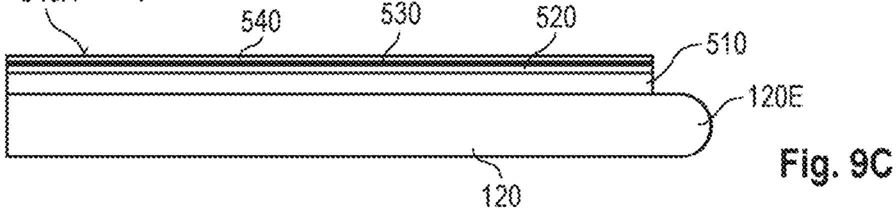

FIGS. 9A-9C illustrate exemplary stages of a method of manufacturing a micro-fabricated device (e.g. devices 100, 200, 400) for controlling trapped ions. The method in particular refers to the formation of an electrode layer (e.g. structured electrode layer 125 and/or structured top electrode layer 155) of such device.

The method includes providing a substrate 120. As shown in FIG. 9A, the substrate may, e.g., be a wafer. FIGS. 9A-9C illustrate a partial sectional view of such wafer, with an edge 120E of the substrate 120 representing the wafer edge.

A dielectric layer (not shown in FIGS. 9A-9C, see e.g. dielectric layer 130 of FIGS. 2 and 4) may, e.g., be disposed on the upper surface of the substrate 120. Further, as illustrated in FIGS. 2 and 4, metal layers 135, 145 (not shown in FIGS. 9A-9C) may be formed in the dielectric layer.

Optionally, a metal layer 510 may be formed over the substrate 120. In the example shown, a thick layer (e.g. 2 μm thickness) of, e.g., AlSiCu is deposited over the substrate 120. The deposition of the metal layer 510 may, e.g., be carried out by sputtering or other deposition techniques. The metal layer 510 provides for a high electrical conductivity of the electrode layer to be formed.

Figure 10A:
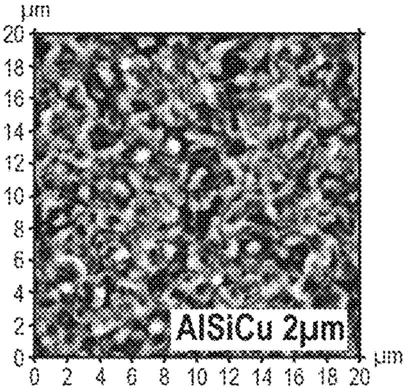
FIG. 10A is an atomic force microscope (AFM) image of a metal layer of AlSiCu.

FIG. 10A is an AFM image of the upper surface of the AlSiCu metal layer 510. An arithmetic mean height A of 17.46 nm and a root-mean-square height of 23.06 nm was measured for the upper surface of the metal layer 510. FIG. 10A illustrates the roughness of the upper surface of the metal layer 510.

Subsequently, an electrically conductive smoothing layer 520 was formed over the metal layer 510. In the example shown, the smoothing layer 520 was, e.g., of TiW. In one example, the smoothing layer 520 was applied by sputtering. A thickness of the smoothing layer 520 was, e.g., controlled to be about 500 nm.

Referring to FIG. 9B, the smoothing layer 520 was planarized to form a planarized surface 520A of the smoothing layer 520. The planarization or thinning of the smoothing layer 520 may, e.g., reduce the thickness of the smoothing layer 520 to be about 200 nm.

The planarization of the smoothing layer 520 can basically be carried out with any process, e.g., by CMP, purely chemically and/or by ion milling.

The smoothing layer 520 should be made of a material which can be planarized very well. In the example shown, TiW was used as a smoothing layer material. Planarization was, e.g., carried out by using an oxidizer hydrogen peroxide ($H_2O_2$) and a mixture of commercially available mechano-chemically acting slurry (term for the chemistry in the CMP process) on a hard polishing cloth to reduce the TiW topography. Subsequently, a mainly mechanically acting "buffing" step was used with commercially available slurry and a very soft polishing cloth. The combination of both steps allowed to achieve the desired process result, i.e. the desired low roughness Ra of the planarized surface 520A in the single digit nm range.

Figure 10B:
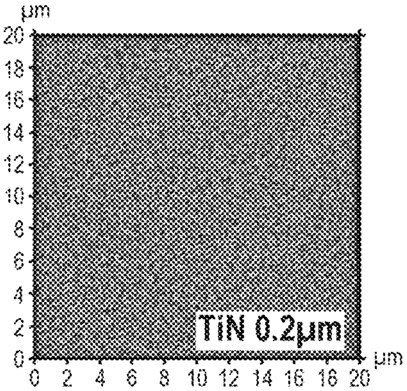
FIG. 10B is an AFM image of an electrically conductive smoothing layer of TiW having a planarized surface.

FIG. 10B is an AFM image of the polished surface 520A of the TiW smoothing layer 520. An arithmetic mean height A of 0.707 nm and a root-mean-square height of 0.970 nm were measured.

Referring to FIG. 9C, the electrically conductive top layer 540 is formed over the planarized surface 520A of the smoothing layer 520. In the example shown, an adhesion layer 530 of, e.g., Ti was deposited on the planarized surface 520A of the smoothing layer 520 prior to applying the top layer 540. For example, the adhesion layer 530 was deposited by sputtering in a thickness of, e.g., 20 nm. The adhesion layer 530 improved the adhesion of the top layer 540 (e.g. TiN layer) on the planarized surface 520A of the smoothing layer 520 (e.g. TiW layer).

In the example of FIGS. 9A-9C, the TiN top layer 540 was formed by sputtering. The top layer 540 had a thickness of 200 nm, for example. Generally, the top layer 520 may be deposited by sputtering or electroplating or any other deposition technique. Further, all specific features (as, e.g., of materials, layer thicknesses, processes, etc.) disclosed in the context of FIGS. 9A-9C can be separately combined with generalizations of the described processes and/or devices.

Figure 10C:
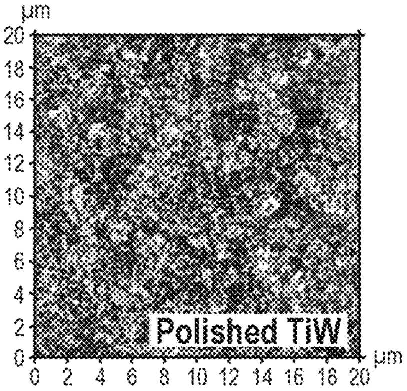
FIG. 10C is an AFM image of an electrically conductive top layer of TiN.

FIG. 10C illustrates an AFM image of the exposed surface 540A of a TiN top layer 540. The small surface roughness of the planarized surface 520A of the smoothing layer 520 was transferred into the exposed surface 540A of the top layer 540. The exposed surface 540A exhibited an arithmetic mean height A of 0.9071 nm and a root-mean-square height of 1.147 nm. The roughness Ra of the exposed surface 540A of the top layer 540 was measured to 3.12 and 3.48 and 4.21 and 3.46 nm at four different measurement areas distributed over the entire wafer. The mean roughness Ra measurements of the exposed surface 540A of the top layer 540 at measurement areas distributed across the wafer yielded a wafer mean roughness of Ra=3.6 nm. Generally, the thinner the top layer 540, the better is the preservation of the low surface roughness of the smoothing layer 520 through the formation of the top layer 540.

On the other hand, an attempt was made to directly smooth the top layer 540 by planarization without using an underlying smoothing layer 520. It was found that without smoothing layer 520 the top layer 540 could not be produced with an exposed surface 540A of low roughness (such as the exposed surface having a mean surface roughness equal to or less than Ra=5 nm, for example).

If using the smoothing layer 520 as disclosed above, the high smoothness of the top layer 540 is caused by the high smoothness of the planarized surface 520A of the smoothing layer 520. No planarization process needs to be carried out at the top layer 540.

After wafer or substrate processing (see, e.g., FIGS. 9A-9C), the multilayer stack is structured to form the structured electrode layer 125 and/or structured top electrode layer 155. The structured electrode layer 125, 155 is formed by lithography including etching the smoothing layer 520 and the top layer 540.

Structuring can be carried out by a process which has virtually no or little effect on the surface roughness of the exposed surface 540A of the top layer 540. For example, plasma etching has negligible effect on the roughness of the exposed surface 540A. Therefore, roughness measurements carried out on the structured electrode layer 125 (see FIG. 8) also apply to the roughness of the exposed surface 540A before structuring, and vice versa.

It is to be noted that the smoothing layer 520 and the metal layer 510 may be the same layer, i.e. that the function of providing for sufficient electrical conductivity and the function of providing a highly planarized surface 520A may be performed by the same material. In this case the smoothing layer 520 may have, e.g., a thickness equal to or higher than 500 nm. For example, the thickness of the smoothing layer 520 may then correspond to the above values for the metal layer 510. Further, as disclosed above, it is possible that the smoothing layer 520 is made of a metal.

According to another aspect of the disclosure, a microfabricated device for controlling trapped ions may comprise a substrate and a structured electrode layer disposed over the substrate, wherein the structured electrode layer forms a plurality of electrodes of an ion trap configured to trap ions in a space above the structured electrode layer. The structured electrode layer is formed of a multilayer stack, the multilayer stack comprises a metal layer 510 and an electrically conductive top layer 540 disposed over the metal layer 510, wherein the electrically conductive top layer 540 has a planarized surface and is of Ti or TiN. It has been found that the exposed surface 540A of a top layer 540 of Ti or TiN can be planarized (e.g. by CMP) to "directly" provide for a surface having a low roughness Ra as small as described above. In other words, a smoothing layer 520 is not necessarily needed if the conductive top layer 540 is of Ti or TiN.

For a multilayer stack including a planarized top layer 540 of Ti or TiN and a metal layer 510 (and, e.g., optionally but not necessarily a smoothing layer 520), the following combinations may, e.g., be used in the notation [planarized top layer 540 | metal layer 510]:

[Ti | Al], [Ti | AlSiCu], [Ti | Cu],

[TiN | Al], [TiN | AlSiCu], [TiN | Cu].

In this example, the planarized exposed surface 540A of the Ti top layer 540 may, e.g., have a mean surface roughness equal to or less than Ra=10 nm or 5 nm.

The following examples pertain to further aspects of the disclosure:

Example 1 is a micro-fabricated device for controlling trapped ions, the micro-fabricated device comprising: a substrate; and a structured electrode layer disposed over the substrate, wherein the structured electrode layer forms a plurality of electrodes of an ion trap configured to trap ions in a space above the structured electrode layer, wherein the structured electrode layer is formed of a multilayer stack, the multilayer stack comprising an electrically conductive smoothing layer having a planarized surface, and an electrically conductive top layer disposed over the planarized surface of the smoothing layer, the top layer providing an exposed surface of the structured electrode layer, the exposed surface having a mean surface roughness equal to or less than Ra=5 nm.

In Example 2, the subject matter of Example 1 can optionally include wherein the top layer comprises TiN or Ti.

In Example 3, the subject matter of any of the preceding Examples can optionally include wherein the smoothing layer has a thickness equal to or less than 500 nm or 400 nm or 350 nm.

In Example 4, the subject matter of any of the preceding Examples can optionally include wherein the smoothing layer comprises TiW or Ti or W or Ta or Al or AlSiCu or Cu.

In Example 5, the subject matter of any of the preceding Examples can optionally include wherein the top layer directly contacts the planarized surface of the smoothing layer, or an adhesion layer is disposed between the planarized surface of the smoothing layer and the top layer.

In Example 6, the subject matter of Example 5 can optionally include wherein, if an adhesion layer is disposed between the planarized surface of the smoothing layer and the top layer, the adhesion layer has a thickness equal to or less than 50 nm or 30 nm.

In Example 7, the subject matter of any of the preceding Examples can optionally include wherein a mean surface roughness of the planarized surface of the smoothing layer is equal to or less than Ra=5 nm.

In Example 8, the subject matter of any of the preceding Examples can optionally include wherein the multilayer stack further comprises a metal layer disposed between the substrate and the smoothing layer, wherein the metal layer has a thickness equal to or greater than 500 nm or 1000 nm or 1500 nm.

In Example 9, the subject matter of Example 9 can optionally include wherein the metal layer comprises Al or AlSiCu or Cu.

Example 10 is a method of manufacturing a micro-fabricated device for controlling trapped ions, the method comprising: providing a substrate; forming an electrically conductive smoothing layer over the substrate; planarizing the smoothing layer to form a planarized surface of the smoothing layer; and forming an electrically conductive top layer over the planarized surface of the smoothing layer, the top layer providing an exposed surface of a structured electrode layer forming a plurality of electrodes of an ion trap configured to trap ions in a space above the structured electrode layer, the exposed surface having a mean surface roughness equal to or less than Ra=5 nm.

In Example 11, the subject matter of Example 10 can optionally include wherein a mean surface roughness of the planarized surface of the smoothing layer is equal to or less than Ra=5 nm.

In Example 12, the subject matter of Example 10 or 11 can optionally include wherein planarizing comprises chemical mechanical planarization.

In Example 13, the subject matter of any of Examples 10 to 12 can optionally include wherein forming the top layer comprises sputtering or electroplating.

In Example 14, the subject matter of any of the Examples 11 to 14 can optionally include forming a metal layer over the substrate before forming the smoothing layer, wherein the metal layer has a thickness equal to or greater than 500 nm or 1000 nm or 1500 nm.

In Example 15, the subject matter of any of the Examples 10 to 14 can optionally include wherein the structured electrode layer is formed by lithography including etching the smoothing layer and the top layer.

Although specific examples have been illustrated and described herein, it will be appreciated by those of ordinary skill in the art that a variety of alternate and/or equivalent implementations may be substituted for the specific examples shown and described without departing from the scope of the present invention. This application is intended to cover any adaptations or variations of the specific examples discussed herein. Therefore, it is intended that this invention be limited only by the claims and the equivalents thereof.

What is claimed is:

1. A micro-fabricated device for controlling trapped ions, the micro-fabricated device comprising:
- a substrate; and
- a structured electrode layer disposed over the substrate,
- wherein the structured electrode layer forms a plurality of electrodes of an ion trap configured to trap ions in a space above the structured electrode layer,
- wherein the structured electrode layer is formed of a multilayer stack, the multilayer stack comprising:
  - an electrically conductive smoothing layer having a planarized surface; and
  - an electrically conductive top layer disposed over the planarized surface of the smoothing layer, the top layer providing an exposed surface of the structured electrode layer, the exposed surface having a mean surface roughness equal to or less than Ra=5 nm.

2. The micro-fabricated device of claim 1, wherein the top layer comprises TiN or Ti.

3. The micro-fabricated device of claim 1, wherein the smoothing layer has a thickness equal to or less than 500 nm.

4. The micro-fabricated device of claim 1, wherein the smoothing layer comprises TiW or Ti or W or Ta or Al or AlSiCu or Cu.

5. The micro-fabricated device of claim 1, wherein the top layer directly contacts the planarized surface of the smoothing layer.

6. The micro-fabricated device of claim 1, wherein the multilayer stack further comprises:
- an adhesion layer disposed between the planarized surface of the smoothing layer and the top layer.

7. The micro-fabricated device of claim 6, wherein the adhesion layer has a thickness equal to or less than 50 nm.

8. The micro-fabricated device of claim 1, wherein a mean surface roughness of the planarized surface of the smoothing layer is equal to or less than Ra=4 nm.

9. The micro-fabricated device of claim 1, wherein the multilayer stack further comprises:
- a metal layer disposed between the substrate and the smoothing layer, wherein the metal layer has a thickness equal to or greater than 500 nm.

10. The micro-fabricated device of claim 9, wherein the metal layer comprises Al or AlSiCu or Cu.

11. The micro-fabricated device of claim 1, wherein the multilayer stack further comprises:

a metal layer disposed between the substrate and the smoothing layer, wherein the metal layer has a thickness equal to or greater than 1000 nm.

12. The micro-fabricated device of claim 1, wherein the multilayer stack further comprises:

a metal layer disposed between the substrate and the smoothing layer, wherein the metal layer has a thickness equal to or greater than 1500 nm.

13. A method of manufacturing a micro-fabricated device for controlling trapped ions, the method comprising:

providing a substrate;

forming an electrically conductive smoothing layer over the substrate;

planarizing the smoothing layer to form a planarized surface of the smoothing layer; and forming an electrically conductive top layer over the planarized surface of the smoothing layer, the top layer providing an exposed surface of a structured electrode layer forming a plurality of electrodes of an ion trap configured to trap ions in a space above the structured electrode layer, the exposed surface having a mean surface roughness equal to or less than Ra=5 nm.

14. The method of claim 13, wherein a mean surface roughness of the planarized surface of the smoothing layer is equal to or less than Ra=4 nm.

15. The method of claim 13, wherein the planarizing comprises chemical mechanical planarization.

16. The method of claim 13, wherein forming the top layer comprises sputtering or electroplating.

17. The method of claim 13, further comprising:

forming a metal layer over the substrate before forming the smoothing layer, wherein the metal layer has a thickness equal to or greater than 500 nm.

18. The method of claim 13, wherein the structured electrode layer is formed by lithography including etching the smoothing layer and the top layer.

19. The method of claim 13, further comprising:

forming an adhesion layer on the planarized surface of the smoothing layer prior to forming the top layer.

20. The method of claim 19, wherein forming the adhesion layer comprises depositing Ti on the planarized surface of the smoothing layer prior to forming the top layer.

* * * * *